(12) United States Patent
Cordina

(10) Patent No.: US 6,628,853 B1
(45) Date of Patent: Sep. 30, 2003

(54) OPTICAL AMPLIFIERS

(75) Inventor: Kevin J Cordina, Bishops Stortford (GB)

(73) Assignee: Bookham Technology, PLC, Abingdon (GB)

( * ) Notice: Subject to any disclaimer, the term of this patent is extended or adjusted under 35 U.S.C. 154(b) by 62 days.

(21) Appl. No.: 10/024,994

(22) Filed: Dec. 18, 2001

(51) Int. Cl.$^7$ .................................................. G02B 6/12
(52) U.S. Cl. ............................ 385/14; 385/24; 385/37; 385/46; 359/341.1; 372/50
(58) Field of Search .............................. 385/14, 15, 24, 385/27, 37, 46, 129; 359/160, 134, 337, 341.7; 372/6, 32, 50, 96

(56) References Cited

U.S. PATENT DOCUMENTS 6,243,514 B1    6/2001   Thompson ................... 385/37

*Primary Examiner*—Phan T. H. Palmer
(74) *Attorney, Agent, or Firm*—Lahive & Cockfield, LLP

(57) ABSTRACT

An optical amplifier is constituted by a planar waveguide having an optical core intersected by a transverse trench occupied by a polymeric optically amplifying medium. An optical pump for the amplifier is provided by a laser diode positioned to direct its emission, transversely with respect to the waveguide axis, into the polymer.

12 Claims, 5 Drawing Sheets

OPTICAL AMPLIFIERS

FIELD OF THE INVENTION

This invention relates to optical amplifiers, and finds particular, but not necessarily exclusive application in the construction of low gain amplifiers, amplifiers providing only a few dB of gain or less, as opposed to line amplifiers, which are typically required to provide significantly more than ten dB of gain. (For the purposes of this specification, the terms 'optical' and 'light' should be understood as pertaining not only to the visible part of the electromagnetic spectrum, but also to the infra-red and ultra-violet parts that bound the visible part.)

BACKGROUND TO THE INVENTION

The essential components of an optical amplifier comprise an optical input port optically coupled with an output port via an optical transmission path that includes an optical gain medium, and means for powering that gain medium. In the case of known semiconductor optical amplifiers, the power is electrical power, and hence such an amplifier is provided with electrodes by which electrical power is applied. In the case of known rare-earth doped glass optical fibre amplifiers, the power is optical power, and this is conveniently applied via the input port, the output port, or in some circumstances simultaneously through both ports.

A known form of optical amplifier of more recent origin is the broadband polymer amplifier. Such amplifiers are the subject of research at St. Andrews University, Fife, Scotland, and some of the research carried out there has been publicly described by Professor I Samuel at the Rank Prize Conference on Broadband Optical Amplifiers held at Grassmere, England Jun. $18^{th}$ to $21^{st}$, 2001. Amongst such polymer amplifiers are those that may be termed direct emitting polymers in order to distinguish them from other polymer amplifiers in which the polymer acts as a host for an active ingredient in an manner analogous with the way the glass matrix of a rare-earth doped glass optical fibre amplifier acts as a host for the rare-earth dopant. The above-referenced authors have described an optical set-up for investigating the optical amplification provided by these polymers in which the polymer takes the form of a thin film supported upon a planar substrate of lower refractive index. A cross-section of such a set up is schematically depicted in FIG. 1 in which the polymer film is depicted at 10 and its supporting substrate at 11. A light signal to be amplified is launched as a collimated beam 12 into a prism 13 to emerge at grazing incidence from a face of the prism in contact with the film 10. A beam 14 of pump light is directed into the polymer film 10, and the amplified signal 15 emerges from the far end of the film.

It has been found that these optically amplifying polymers are capable of exhibiting a gain per unit length (measured along the transmission path of the optical signal being amplified) that is significantly larger than that commonly exhibited either by rare-earth doped glass optical fibre amplifiers and that commonly exhibited by semiconductor amplifiers. In the case of direct emitting polymers, it is postulated that the particularly high gain per unit length results from the fact that light emission occurs from electrons within the molecular structure of the polymer itself, rather than from electrons within a dopant, and that accordingly the density of optically active sites is particularly high.

SUMMARY OF THE INVENTION

The present invention is directed to the construction of a new topology of optical amplifier made practical by the availability of amplifying media with high gain per unit length.

An undesirable feature of passive integrated optics devices, and also integrated optics devices that incorporate active components but no gain-providing components, is that they inevitably attenuate to a certain extent any signal caused to propagate through them. In many circumstances this attenuation is only of the order of 1 dB. However this can present a problem, particularly if the signal is caused to propagate through two or more of such devices arranged optically in cascade and without any intervening amplifier. This invention provides a way of compensating, at least in part, for such attenuation by integrating an optical amplifier with such an integrated optics device, converting it into a hybrid device including an active component.

According to a first aspect of the present invention, there is provided an optical amplifier having an optical input port optically coupled with an optical output port via an optical waveguide having an optical core intersected by a transverse trench occupied by a polymeric optically amplifying medium.

According to a second aspect of the present invention, there is provided a method of making an optical amplifier including the step of constructing an optical waveguide having a filamentary optical core extending from an input port of the amplifier to an output port thereof, the step of forming a transverse trench in the optical waveguide to intersect its optical core, and the step of depositing an optically amplifying polymer in said trench.

The waveguide is preferably a waveguide of a kind in which a filamentary optical core of a first refractive index is fabricated on a substantially planar supporting substrate of a second refractive index that is lower than the first, the optical core then being covered with material whose refractive index is also lower than that of the optical core (and typically substantially matched with that of the supporting substrate), such a waveguide hereinafter being referred to as a planar waveguide.

Optical pump power may be launched into the optically amplifying medium in the trench axially via the optical waveguide, but generally it may be preferred to launch that power into the medium via its side (transverse launch). This is because, under axial launch conditions, the pump power is confined to the mode(s) guided by the waveguide; whereas, under transverse launch conditions, many more modes are available. Conveniently this transverse launch may be provided by a diode pump laser located on top of the trench.

The refractive index of the polymeric material is fairly close to that of conventional planar waveguides and certainly much less than that of semiconductor materials. Therefore the intrinsic radiative (diffraction) loss involved in coupling light from the part of the waveguide on one side of the trench to the part on the other side is small compared with 0.3 dB for trench thicknesses up to several $\mu$m. Accordingly trench widths of not more than a few microns can be employed to provide amplifier gains of not more than a few dB, sufficient for compensating for the insertion loss of certain types of planar waveguide passive devices, by way of example wavelength multiplexer/demultiplexer devices. Typically it may be found convenient to form the waveguide of the amplifier monolithically with the waveguides of the passive device.

Where higher valued gains are required, two or more amplifying polymer filled transverse trenches may be included optically in cascade along the length of the optical waveguide. If the gain is high enough, the cascade may need to be interrupted by one or more optical isolators to reduce stray feedback to a level sufficient to preclude laser action.

DETAILED DESCRIPTION OF PREFERRED EMBODIMENTS

Figure 2:
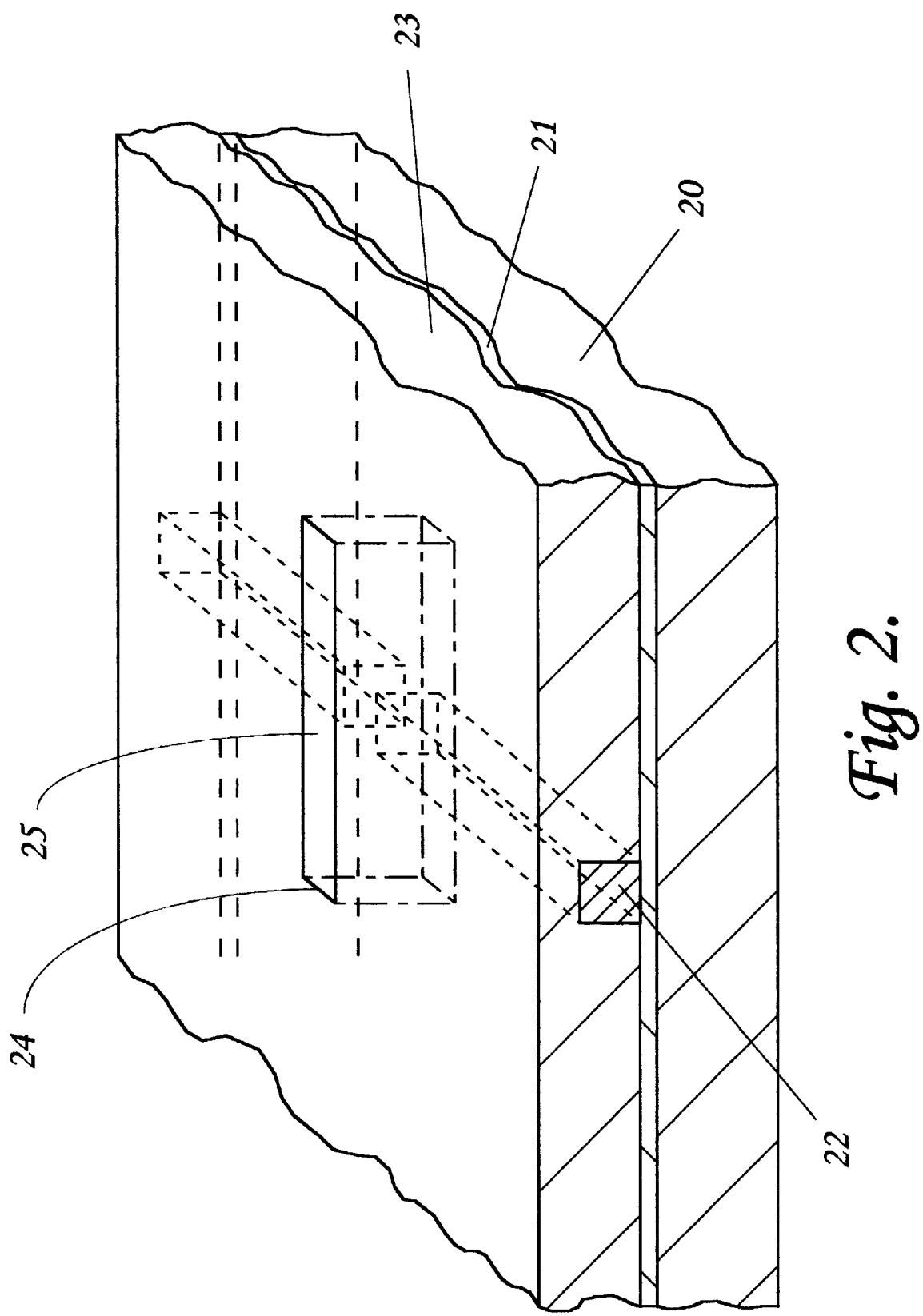
FIG. 2 is a schematic sectioned perspective view of an optical amplifier embodying the invention in a preferred form before it has been provided with its optical pump.

Referring to FIG. 2, on a substrate 20 is formed a silica buffer layer 21. On the buffer layer is deposited a layer of core glass, which is subsequently patterned and selectively etched to leave a waveguide core 22 which is covered with a layer 23 of cladding glass.

The buffer and upper cladding glass layers 21 and 23 have matching refractive indices, a value that is less than that of the core glass of the waveguide core 22. The relative glass transition temperatures of the buffer, core glass and upper cladding glass layers are chosen to keep the distortion of the core, consequent upon deposition of the cladding glass, within acceptable bounds. The thermal expansion coefficient of the cladding glass is preferably matched with that of the silicon substrate. Though the buffer layer has previously been identified as being made of silica, this is not necessarily undoped silica. In a particular example employing a silica coated silicon substrate, the waveguide core 22 may have a 5 µm wide by 6 µm high substantially rectangular cross-section, with the upper cladding glass layer 23 providing an overcladding 12 µm thick. The core/cladding refractive index difference may typically be about 0.01.

A trench 24 intersecting the waveguide core 22 is etched, for instance by reactive ion etching, through the upper cladding glass layer 23 and well into or through the underlying buffer glass layer 21. In order not to introduce excessive intrinsic coupling loss between the part of the waveguide core upstream of the trench 24 and its counterpart downstream of the trench, the trench is made not more than 25 µm in extent in the axial direction of the waveguide, and is typically made about 3 µm in extent in this direction. This trench is then filled with optical amplifying polymer 25. This polymer, which may for instance be a poly(9,9-dioctylfluorene) may be deposited in the trench for instance from aqueous solution or by a spin-coating process analogous with the way photo-resist films are conventionally applied in semiconductor device manufacture. After the polymer has been cured, excess polymer is removed from the upper surface of the cladding glass layer 23, for instance by chemical reaction etching. The device is then ready for a pump diode laser 30 (FIG. 3), itself mounted on a heat-sink 31, to be mounted on the upper cladding layer 23 with an alignment such that the laser emission is directed straight into the amplifying medium 25 in the trench 24.

Figure 1:
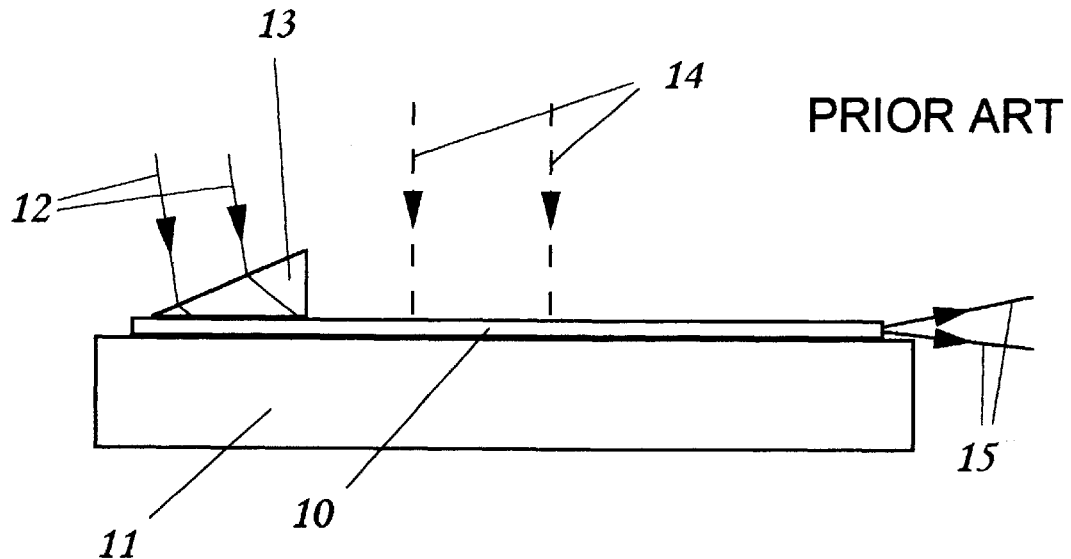
FIG. 1 (to which reference has already been made) schematically depicts a prior art set-up for measuring the optical gain of optically amplifying polymers.
Figure 3:
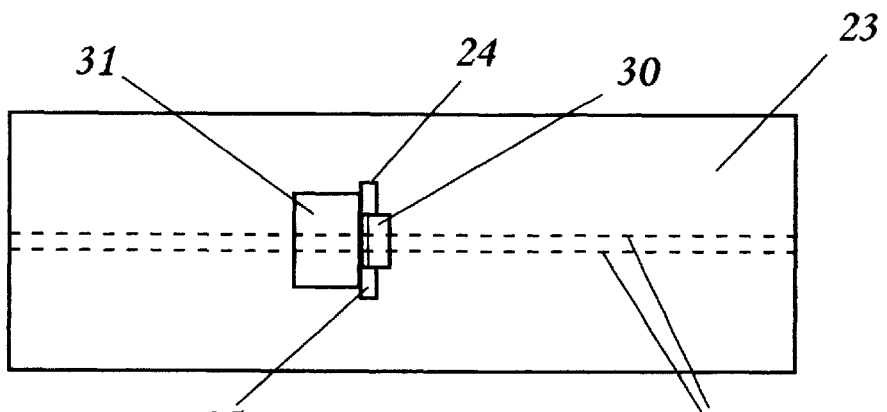
FIG. 3 is a schematic plan view of the amplifier of FIG. 2 after it has been provided with its optical pump.
Figure 4:
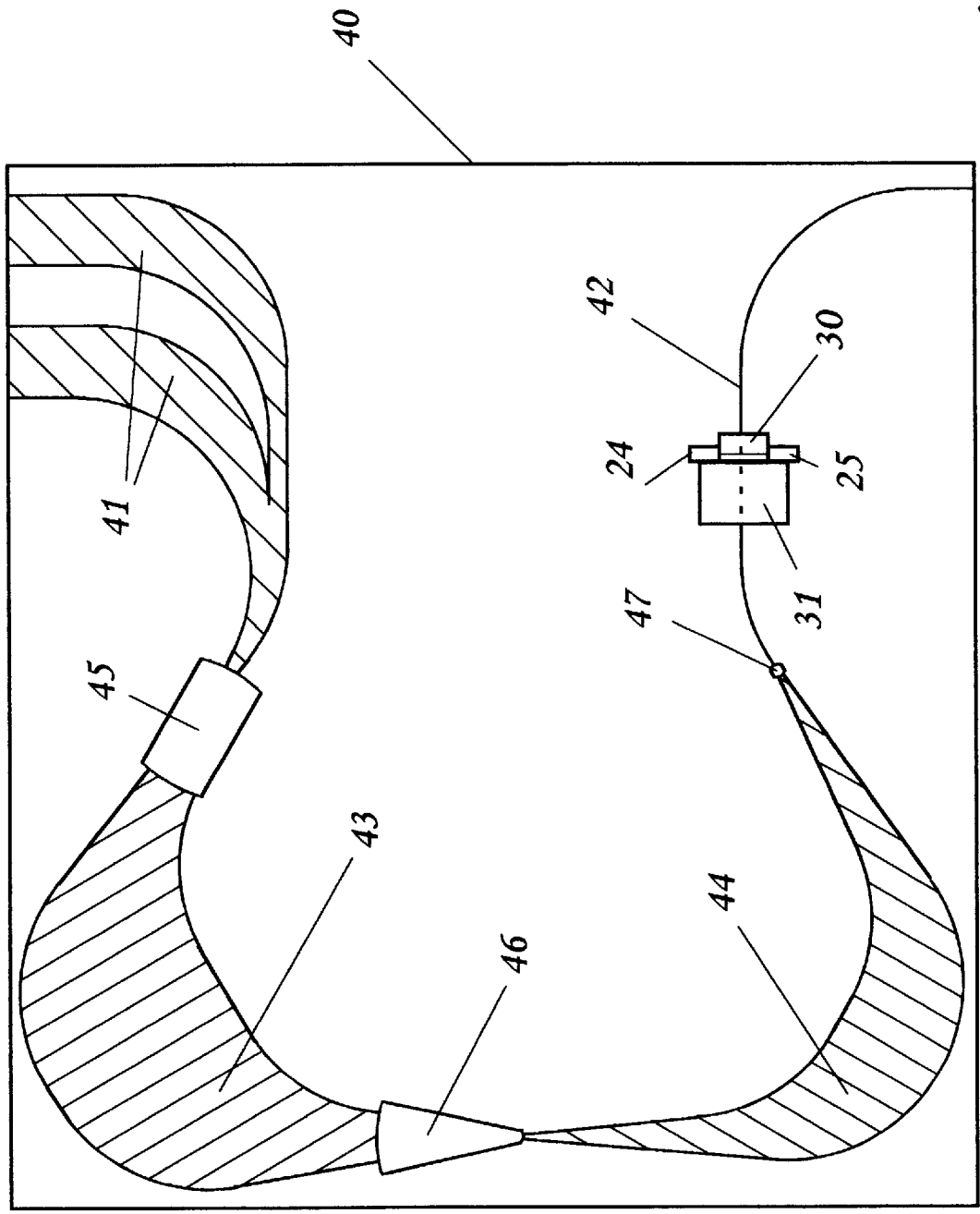
FIG. 4 is a schematic plan view of an arrayed waveguide device which additionally incorporates in its monolithic structure the amplifier of FIG. 3.

The amplifier of FIG. 3 is particularly suited for monolithic incorporation in an integrated optics format device (a planar waveguide device incorporating two or more waveguides, and optionally other optical elements of an active or passive nature), such as a wavelength multiplexer/demultiplexer, where it may conveniently be employed to provide a gain substantially matching the loss occasioned elsewhere in the device. By way of illustrative example, FIG. 4 schematically depicts an integrated optics format arrayed waveguide grating multiplexer/demultiplexer 40 incorporating such an amplifier. This arrayed waveguide grating multiplexer/demultiplexer 40 of FIG. 4 is of a type particularly described in the specification of U.S. Pat. No. 6,243,514. It has a plurality of single mode input/output waveguides 41 (arranged in two groups) optically coupled with a single mode output/input waveguide 42 via the series combination first and second waveguide grating arrays 43, 44 and three radiative star type coupling regions 45, 46 and 47. In the single mode output/input waveguide 42 is formed the amplifier trench 24 which is filled with the amplifying polymer 25 and over which is positioned the diode pump laser 30 on its heat-sink 31. For further details of the construction and manner of operation of this arrayed waveguide grating multiplexer/demultiplexer device reference to the above-referenced United States Patent Specification.

Figure 5:
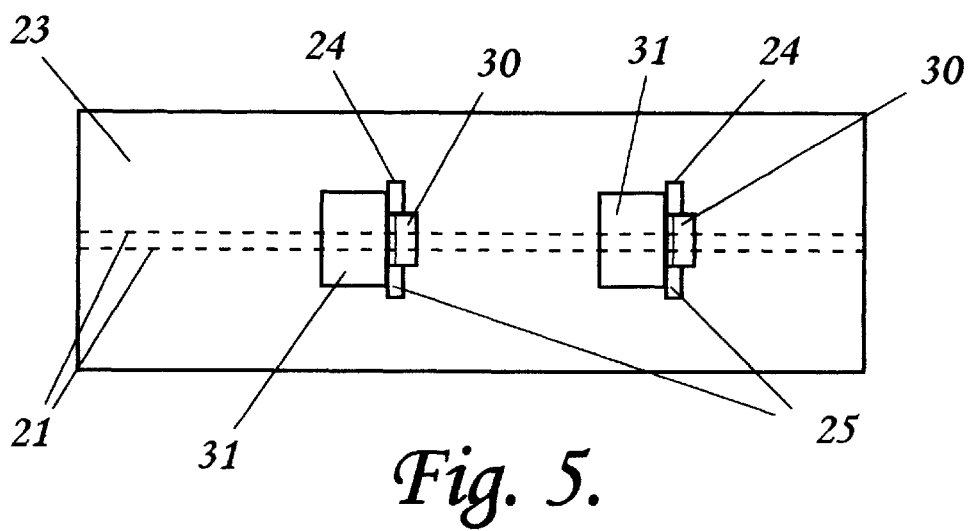
FIG. 5 is a schematic plan view of the amplifier of FIG. 2 modified to incorporate a second amplifying stage optically in series with the first.

The foregoing specific description has related exclusively to amplifiers with but a single amplifying polymer filled trench, but it is to be understood that where more gain is required to be provided than is conveniently supplied by a single one of such filled trenches, two or more of them, each of them provided with its associated pump laser diode, may be arranged optically in series along a single waveguide, as for instance schematically depicted in FIG. 5.

Figure 6:
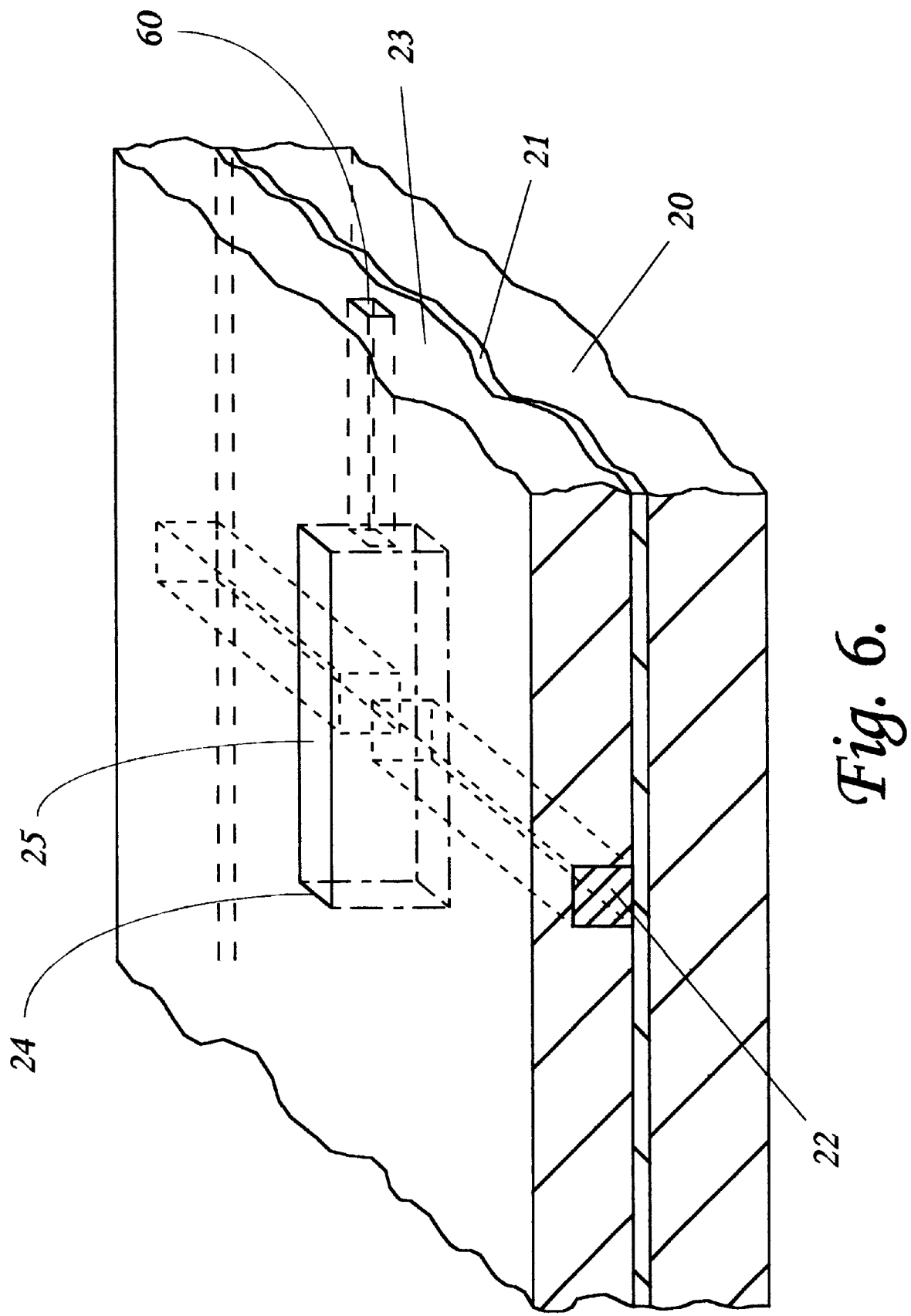
FIGS. 6 and 7 are schematic sectioned perspective views of optical amplifiers with alternative configurations of optical pumping that are variants of the optical amplifier of FIG. 3.
Figure 7:
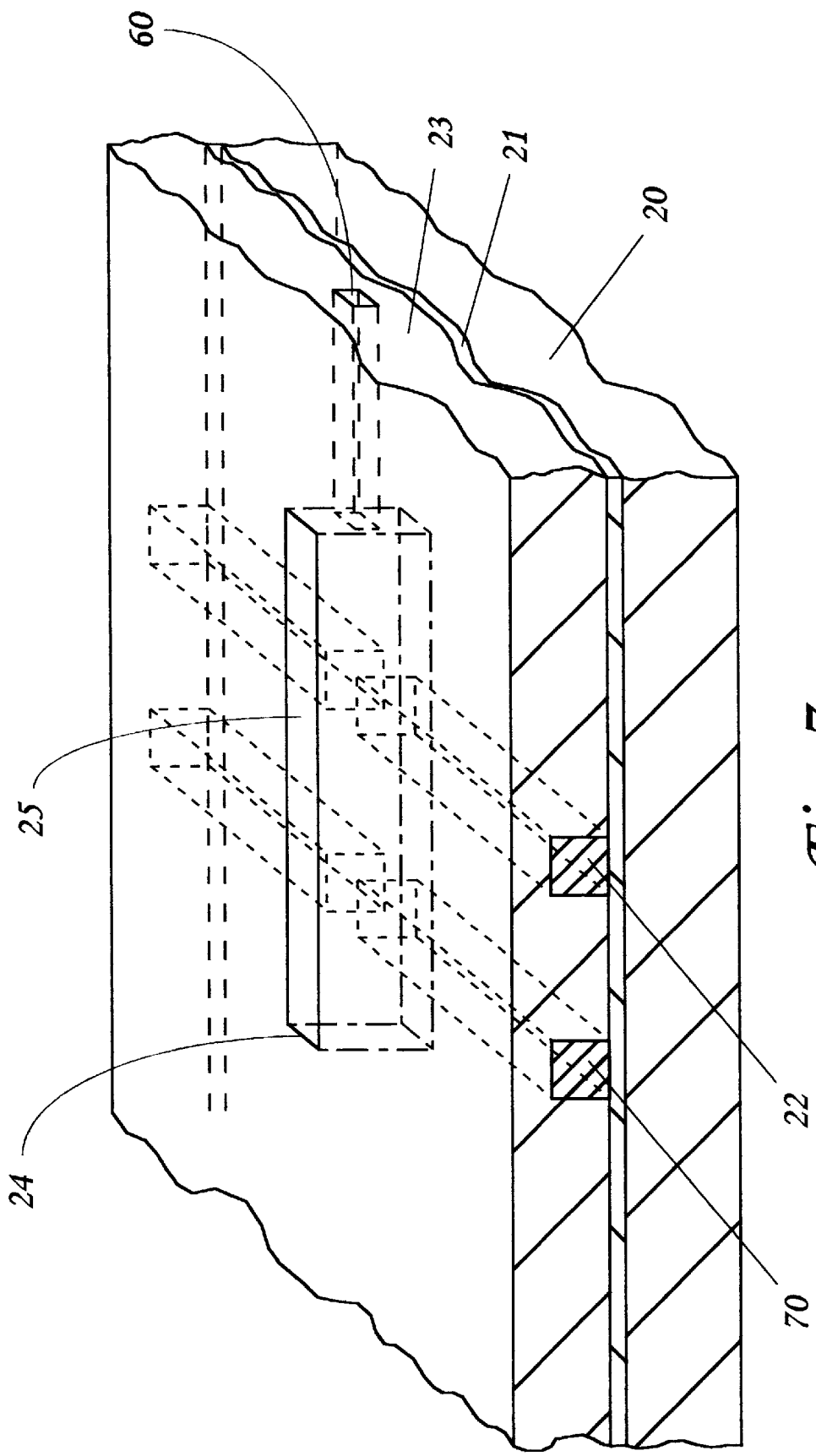

In each of the described embodiment described above with particular reference to FIGS. 3 and 5 optical pump power is directed into the trench from a diode laser mounted on the cladding glass layer directly over the trench. This form of pump power launch has been described as a transverse launch of pump power to distinguish it from an axial lunch configuration in which the pump power is directed into the trench along the waveguide along which the signal to be amplified is propagating. A third configuration of pump power launch, an alternative configuration of transverse launch, is illustrated in the amplifiers of FIGS. 6 and 7. The amplifier of FIG. 6 is distinguished from that of FIG. 2 by the provision of an additional waveguide core 60 that terminates in a side-wall of the trench 24, and along which optical pump power from an optical pump (not shown) at a remote location is directed into the amplifying polymer 25. This additional waveguide core 60 may be of a composition and size chosen to make the waveguide multimode so that it is able to transport a greater proportion of the power available from the source than might be possible if the waveguide were single-moded. With this configuration of pump power launch it is possible, as for instance illustrated in FIG. 7, to arrange for the polymer-filled trench 24 to intersect more than one signal-carrying waveguide, such as that provided by the additional waveguide core 70, so that different signals propagating along different signal waveguides may be simultaneously amplified using pump power from the same pump source (not shown). It is also possible to employ the substantially the same pump power launch conditions as depicted in FIGS. 6 and 7, but to dispense with the additional waveguides 60 and 70, relying instead upon direct launch of the pump power into the cladding glass layer 23 and/or the buffer layer 21. Under appropriate conditions, these layers will provide a measure of waveguiding in the direction normal to the plane of these layers, though none within the plane of these layers. Accordingly the pump light will spread out laterally within these layers. This can be useful in embodiments in which more than one amplifying polymer filled trench is required to be pumped by a single pump source, for instance an embodiment using the same trench layout as depicted in FIG. 5, but an alternative pumping geometry.

What is claimed is:

1. An optical amplifier having an optical input port optically coupled with an optical output port via an optical waveguide having an optical core intersected by a transverse trench occupied by a polymeric optically amplifying medium.

2. An optical amplifier as claimed in claim 1, the waveguide of which amplifier is a planar waveguide forming a monolithic structure with one or more waveguides of an integrated optics structure.

3. An optical amplifier as claimed in claim 2, wherein the integrated optics structure is a passive integrated optics structure.

4. An optical amplifier as claimed in claim 3, wherein the integrated optics structure is a wavelength multiplexer/demultiplexer.

5. An optical amplifier as claimed in claim 2, wherein the integrated optics structure includes at least one active non-amplifying component.

6. An optical amplifier as claimed in claim 1, which amplifier additionally incorporates an optical pump optically pumped with the polymeric optically amplifying medium via a further waveguide terminating in a side-wall of the trench.

7. An optical amplifier as claimed in claim 6, wherein the optical waveguide having an optical core intersected by the transverse trench is one of a set of at least two waveguide having an optical core intersected by the transverse trench.

8. An optical amplifier as claimed in claim 1, the core of whose waveguide is intersected optically by at least one further transverse trench occupied by a polymeric optically amplifying medium.

9. An optical amplifier as claimed in claim 8, each transverse trench occupied by a polymeric optically amplifying medium is provided with an associated pump laser diode.

10. An optical amplifier as claimed in claim 1, which amplifier additionally incorporates a pump laser diode positioned to direct light into the polymer in the trench transversely with respect to the waveguide axis.

11. A method of making an optical amplifier including the step of constructing an optical waveguide having a filamentary optical core extending from an input port of the amplifier to an output port thereof, the step of forming a transverse trench in the optical waveguide to intersect its optical core, and the step of depositing an optically amplifying polymer in said trench.

12. A method as claimed in claim 11, and further including the step of locating a diode pump laser with respect to the trench so that its laser emission is directed, transversely with respect to the filamentary optical core, into the polymer in the trench.

* * * * *